Dec. 12, 1961   R. T. KELLEY ET AL   3,012,947
RECOVERY OF HIGH PURITY ISOPRENE FROM LIGHT
STEAM CRACKED DISTILLATE
Filed June 15, 1959
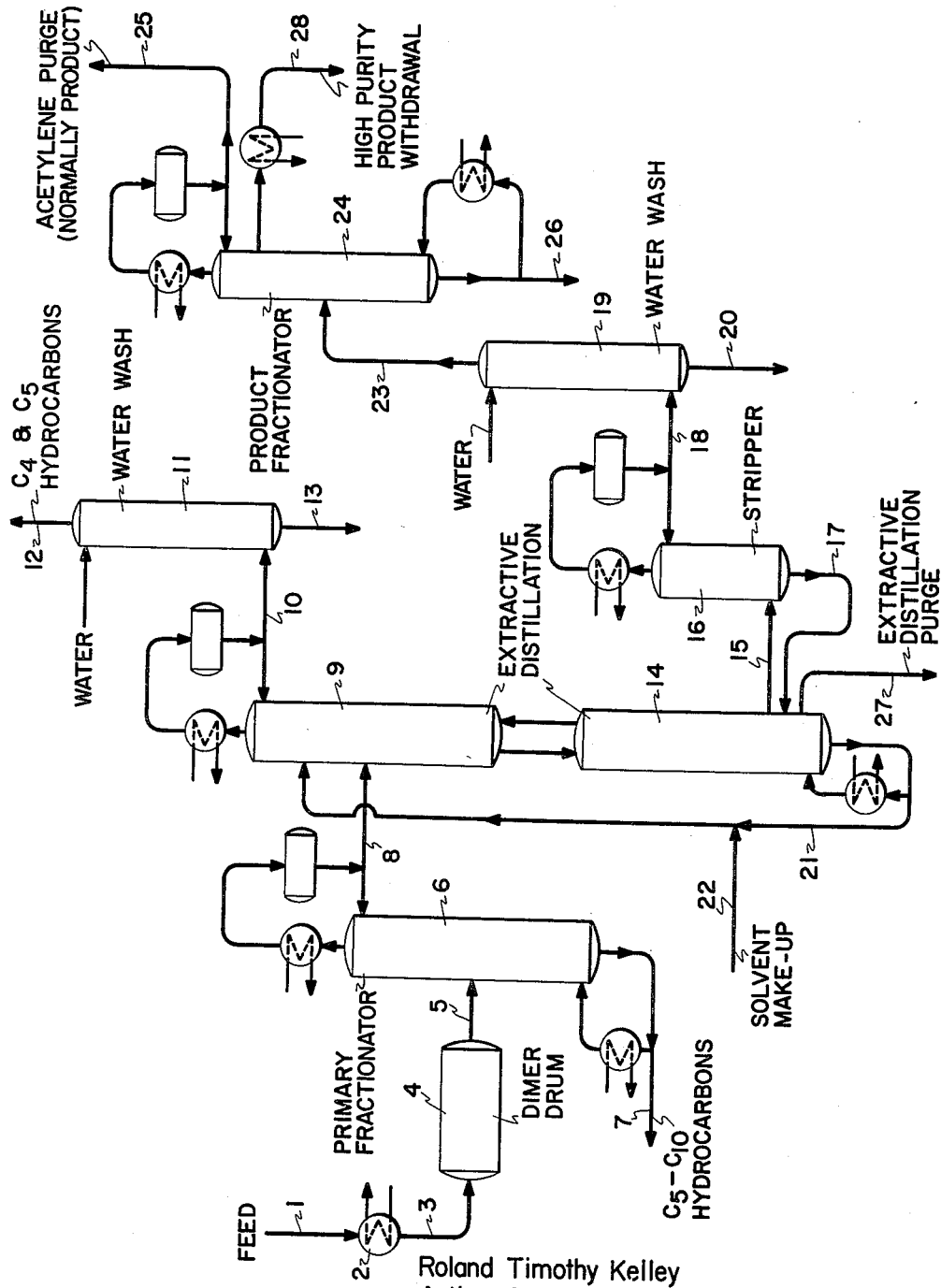
Roland Timothy Kelley
Arthur Douwe deVries    INVENTORS
Jimmy Donald James
James Edward Walker
BY *Seymour Stahl*
PATENT ATTORNEY 3,012,947
RECOVERY OF HIGH PURITY ISOPRENE FROM LIGHT STEAM CRACKED DISTILLATE
Roland Timothy Kelley, Arthur Douwe de Vries, Jimmy Donald James, and James Edward Walker, all of East Baton Rouge, La., assignors to Esso Research and Engineering Company, a corporation of Delaware
Filed June 15, 1959, Ser. No. 820,394
9 Claims. (Cl. 202—39.5)

The present invention relates to the production of extremely high purity, above 99% pure, isoprene. More particularly, this invention relates to recovering this extremely high purity isoprene from light steam cracked distillates in a particularly efficient fractionating and extractive distillation process. Most particularly this invention relates to removing alpha acetylenes by extractive distillation and to removing beta acetylenes by normal fractionation.

In the production of new and improved synthetic rubbers, the need for highest purity isoprene is great. Thus the acetylenes which normally are present in the isoprene stream utilized in butyl rubber prevent the utilization of more than a few percent of said isoprene since these acetylenes lower the molecular weight of the product obtained. By making possible the use of larger amounts of isoprene more unsaturated rubbers can be obtained which, of course, produce superior properties after vulcanization. Of particular importance is the use of the present extremely pure isoprene in the production of the new rubber product polyisoprene. This polyisoprene is produced utilizing lithium alkyl catalysts or Ziegler type titanium chloride aluminum trialkyl catalysts, which catalysts are poisoned by the acetylenes present in commercially available isoprene.

The present invention discovery, that 99+% pure isoprene can be cheaply obtained, developed out of an extremely large amount of analytical data on distillations and extractive distillations of isoprene. Thus it has now been surprisingly found that by removing a small side stream of alpha acetylenes in the lower part of the extractive distillation column that the remaining acetylenes present which are mainly beta acetylenes can be efficiently and economically removed as an overhead stream in the final product fractionator. The location of this side stream which permits utilizing the withdrawal of only a small amount of material in the recycle solvent extraction process is extremely important. This stream is located above the bottom of the column solvent withdrawal and recycle system and below the isoprene rich solvent withdrawal system. Thus it has now been determined not only that the alpha acetylenes should be removed in the extractive distillation column but also that these alpha acetylenes should be taken off as a purge stream at an optimum location where this may be accomplished with a minimum removal of isoprene rich material.

The present invention will be more clearly understood from a consideration of the accompanying diagrammatic figure showing an isoprene recovery system incorporating the present improvement.

The conventional system for producing 92-95% isoprene will first be described. A feed stock containing olefins and diolefins having 4 to 9 carbon atoms per molecule is supplied from a steam cracking fractionator by line 1 to heater 2 and thence thru line 3 to dimer heat soak 4. This soaking for dimerizing cyclodienes is controlled in the range of 180 to 240° F. under pressure for a period of 1-30 hours to dimerize cyclodienes selectively with a minimum copolymerization of the isoprene. Thus minimum copolymerization is obtained by leaving some of the cyclopentadiene unreacted. This dimerization is necessary since separation of isoprene from cyclopentadiene by distillation is difficult. This soaking step effects essentially no removal of the acetylenes. After heat soaking the stream from dimer drum 4 is passed thru line 5 to primary fractionator 6. This primary fractionator separates $C_{4s}$ and low boiling $C_{5s}$ which include isoprene from higher boiling $C_5$ and $C_{6s}$ through $C_{10s}$. Since the acetylenes boil below or very close to isoprene they are distilled overhead with the isoprene. The bottom stream from the primary fractionator 6 is passed from the system to further processing through line 7. The overhead isoprene containing stream is passed through line 8 to the upper part 9 of the extractive distillation column. The extractive distillation column separates olefin and paraffin hydrocarbons from diolefins. This is accomplished by carrying out the distillation in the presence of a solvent such as acetone or acetonitrile which renders the diolefins less volatile than the olefins or paraffins. These olefins and paraffins are taken over head with a small amount of the acetone solvent and are passed through line 10 to water wash tower 11. This water wash tower removes acetone from the overhead stream and the washed olefins and paraffins are passed through line 12 to further processing elsewhere. Water and acetone passed from the bottom of the column through line 13 may be passed to a recovery system and recycled. The extracted isoprene product is passed from a point in the lower part 14 of the extractive distillation column and is passed through line 15 to stripper 16. In the stripper hydrocarbons are stripped overhead from the acetone and the stripped solvent is recycled to the column through line 17. These hydrocarbons are then passed through line 18 to a further water wash tower 19 where remaining acetone is removed through line 20. Returning to the extractive distillation column from the bottom of said column a bottoms stream is recycled to the top section 9 of the column through line 21. Additionally, solvent recovered from the separation system previously described is recycled after purification through line 22 to join line 21. From water wash tower 19 the overhead hydrocarbon isoprene containing stream is passed through line 23 to final product fractionator 24. This fractionator separates the majority of the remaining cyclopentadiene, piperylenes, and trimethylethylene from the isoprene which is distilled overhead through line 25. Since the acetylenes are lower boiling than isoprene or boil very close to isoprene they are distilled overhead with the isoprene. The bottoms from column 24 are passed through line 26 and are recycled to the feed or are otherwise used.

According to the high purity isoprene recovery system of the present invention an extractive distillation purge stream of alpha acetylenes is removed near the bottom of the bottom section 14 of the extractive distillation column through line 27. Further, a purge stream is taken from the top of the final product fractionator column 24 through line 25 and the high purity isoprene product is taken from the column as a side stream through line 28. This side stream is cooled, of course, to condense the isoprene product.

According to the process of the present invention the total purge taken both in the extractive distillation step and in the final product fractionation step is less than that taken in the prior art purge from the product fractionator only. The relative amounts of the purge streams of the present invention are as follows: extractive distillation purge—3-10 wt. percent, preferably 3-6 wt. percent based on the extract stream passed to the stripper, final product fractionator purge—5-15 wt. percent, preferably 5-10 wt. percent, based on the total high purity isoprene obtained in the process. The improvement obtained by utilizing the purge streams as described can be seen from the plant data shown in Table I below. Typical relative stream rates are shown in Table II for the conventional prior art process.

TABLE I

*Diolefin extraction unit typical stream analyses, mol. percent*

| Stream | Isoprene | Dimethyl Acetylene | Alpha Acetylenes | Cyclo Pentadiene | Cis and Trans Piperylene | Pentenes and Pentanes | Others |
|---|---|---|---|---|---|---|---|
| Primary Fractionator Overhead | 23.7 | 0.3 | 0.1 | 0.6 | 0.8 | 68.4 | 6.1 |
| Extraction Tower 5th Tray [1] | 48.52 | 0.01 | 1.69 | 14.18 | 34.25 | | 1.35 |
| Acetone Stripper Bottoms [1] | 66.04 | 0.28 | 0.80 | 10.81 | 21.94 | | 0.13 |
| Product Fractionator Feed | 90.64 | 1.63 | 0.59 | 2.92 | 3.92 | 0.30 | |
| Product Fractionator Overhead | 96.42 | 2.25 | 0.80 | 0.48 | | 0.05 | |
| Product Fractionator Bottoms | 75.83 | | 0.04 | 9.10 | 14.11 | 0.92 | |
| Product Fractionator 41st Tray | 98.66 | 0.56 | 0.30 | 0.41 | | 0.07 | |
| Product Fractionator 35th Tray | 98.73 | 0.34 | 0.06 | 0.71 | 0.08 | 0.08 | |
| Product Fractionator 30th Tray | 98.13 | 0.29 | | 1.16 | 0.26 | 0.16 | |
| Product Fractionator Sidestream [2] | 98.99 | 0.28 | 0.06 | 0.47 | | 0.20 | |
| Product Fractionator Sidestream [3] | 99.79 | 0.01 | | 0.10 | 0.05 | 0.05 | |

[1] Excluding acetone content.
[2] Actual sidestream purity when withdrawing sidestream from conventional prior art process.
[3] Estimated product purity with proper design of modified process.

TABLE II

*Conventional prior art diolefin extraction unit typical stream rates*

| Stream | Rate, Lb./Hr. |
|---|---|
| Primary Fractionator Feed | 3,200 |
| Primary Fractionator Overhead Product | 900 |
| Primary Fractionator Bottom Product | 2,300 |
| Primary Fractionator Reflux | 4,000 |
| Extractive Distillation Overhead Product [1] | 837 |
| Extractive Distillation Solvent Rate | 3,000 |
| Extractive Distillation Reflux | [1] 2,700 |
| Acetone Stripper Overhead Product | [3] 217 |
| Acetone Stripper Reflux | [2] 1,100 |
| Product Fractionator Overhead Product | 130 |
| Product Fractionator Bottom Product | 50 |
| Product Fractionator Reflux | 1,500 |

[1] 14% acetone.
[2] 17% acetone.

The data shown in Table I are typical for a diolefin extraction unit producing commercial grade isoprene. From the data it was discovered that acetylenes are not removed from isoprene in the conventional prior art process but are concentrated along with the isoprene in the product stream. Additionally, it should be noted that cyclopentadiene is not easily separated in the product fractionator but is easily separated with the alpha acetylenes in the purge stream removed from the extractive distillation tower. It should further be noted that even if all impurities other than acetylenes were removed, the maximum isoprene purity would be only 96.95 mol percent. This material is entirely unsuited for the production of polyisoprene rubbers and for other uses where an extremely pure isoprene provides large advantages in the final product. Although the commercial diolefin extraction unit was not designed to take full advantage of the present invention, it was possible to produce a small quantity (20 lb./hr.) of high purity isoprene by taking a sidestream from the product fractionator. The analysis of this stream is shown in Table I. Thus it was possible to design the present diolefin extraction unit capable of producing high purity isoprene at high recovery. In general the design consists of more fractionating stages in the product fractionator and in the use of a stripper tower and a water wash tower to remove the acetone from the extractive distillation purge stream. The purge streams, high in acetylenes and other impurities are sent to further processing elsewhere and the recovered acetone is recycled to the process.

Obviously, other methods can be used to carry out the principles of the present invention of first purging alpha acetylenes in extractive distillation and then taking overhead beta acetylenes in the final product fractionator. Thus, for example the overhead from the product fractionator in the conventional prior art process could be fed to a distillation tower where high purity isoprene would be the bottom product and the overhead would be an acetylene rich stream. Also the overhead from the isoprene stripper in the conventional prior art process could be fed to an extractive distillation system similar to the system in which pentenes and pentanes are removed. The overhead stream would be essentially alpha acetylene free and the overhead from the acetone stripper would be rich in alpha acetylene and other impurities. It should be noted also that if the second extractive distillation were properly designed, it would not longer be necessary to have a product fractionator. The piperylenes and cyclopentadiene would be removed overhead in the new acetone stripper.

EXAMPLE

A commercial plant was operated utilizing the conventional prior art process as described in the figure and in Tables I and II. 130 lb./hr. of 96.42 mol percent isoprene was recovered, the total feed was 3,200 lb./hr. of $C_4$–$C_9$ hydrocarbons supplied to primary fractionator 6 from steam cracking. For comparison utilizing the present invention as described in the figure, 125 lb./hr. of 99.79 mol percent isoprene could be recovered when the total feed to the unit is 3,200 lb./hr.

What is claimed is:

1. A process for the separation of isoprene of high purity from a hydrocarbon fraction also containing acetylenes which comprises the steps of extractively distilling the hydrocarbon fraction with a solvent for the isoprene selected from the group consisting of acetone and acetonitrile separating a minor amount of a first extract stream containing more than 1 wt. percent of acetylenes, said acetylenes being predominantly alpha acetylenes, separating a major amount of a second extract stream containing smaller amounts of acetylenes than the first extract stream, fractionating the second stream to separate a minor amount of an isoprene stream containing more than about 2 wt. percent of acetylenes, said acetylenes being predominantly beta acetylenes and a major amount of a highly pure isoprene stream substantially free of acetylenes.

2. The process of claim 1 wherein the hydrocarbon fraction is a C$_5$ hydrocarbon fraction for steam cracking.

3. The process of claim 1 wherein the second extract stream from the extractive distillation step is stripped of solvent prior to the fractionation step.

4. The process of claim 1 in which the solvent is acetone.

5. A process for the separation of isoprene of high purity from a hydrocarbon fraction also containing acetylenes which comprises the steps of extractively distilling the hydrocarbon fraction with a solvent for the isoprene selected from the group consisting of acetone and acetonitrile, separating the first extract stream containing more than 1 wt. percent of acetylenes, said acetylenes being predominantly alpha acetylenes; separating a second extract stream containing smaller amounts of acetylenes than the first extract stream, the amount of the first stream being in the range of 3–10 wt. percent of the second stream, fractionating the second stream to separate an isoprene stream containing more than about 2 wt. percent of acetylenes, said acetylenes being predominantly beta acetylenes, and a highly pure isoprene product stream substantially free of acetylenes, the amount of the acetylene containing isoprene stream obtained from said fractionation being in the range of 5–15 wt. percent of the highly pure isoprene product stream.

6. The process of claim 5 wherein the first extract stream contains more than 1 wt. percent of alpha acetylenes and the acetylene containing isoprene stream obtained from fractionation contains more than about 2 wt. percent of beta acetylenes.

7. The process of claim 5 wherein the first extract stream contains more than 1.5 wt. percent acetylenes and the acetylene containing isoprene stream obtained from fractionation contains more than about 2.5 wt. percent of acetylenes.

8. The process of claim 5 wherein the amount of the first extract stream is in the range of 3–6 wt. percent of the second extract stream and the amount of the acetylene containing isoprene stream obtained from fractionation is in the range of 5–10 wt. percent of the highly pure isoprene product stream.

9. In a process for separating isoprene from a light steam-cracked distillate comprising C$_5$ hydrocarbons in which the light steam-cracked distillate is extractively distilled in an extractive distillation zone with a solvent for isoprene selected from the class consisting of acetone and acetontrile to provide a bottom stream and an isoprene-rich extract stream, said isoprene-rich extract stream being separately removed from the extractive distillation zone, washed to remove isoprene solvent, and the washed extract stream fractionally distilled in a fractionation zone to separate overhead an acetylene-containing isoprene product, the improvement which comprises removing from said extractive distillation zone intermediate the points of removal of said bottom stream and said isoprene-rich extract stream an additional extract stream amounting to less than 10 weight percent of said isoprene-rich extract stream, said additional extract stream containing more than 1 weight percent acetylenes predominantly of the alpha type and said isoprene-rich extract stream containing less than 1 weight percent acetylenes, separating as a sidestream in the subsequent fractional distillation of said isoprene-rich extract stream after the washing thereof an isoprene product of at least 99 weight percent purity and removing overhead from said fractional distillation zone acetylenes predominantly of the beta type admixed with isoprene.

References Cited in the file of this patent

UNITED STATES PATENTS

| | | |
|---|---|---|
| 1,436,289 | Plauson | Nov. 21, 1922 |
| 2,426,604 | Frevel | Sept. 2, 1947 |
| 2,426,706 | Patterson | Sept. 2, 1947 |
| 2,704,778 | Maisel | Mar. 22, 1955 |
| 2,813,134 | Johnson | Nov. 12, 1957 |